United States Patent [19]

Hawkins et al.

[11] Patent Number: 4,852,870

[45] Date of Patent: Aug. 1, 1989

[54] SUBSTITUTE GROUND SURFACE MATERIAL

[75] Inventors: Paul Hawkins, Leicester; John D. Dachtler, Isle of Wight, both of England

[73] Assignee: En-tout-cas plc, Syston, England

[21] Appl. No.: 244,697

[22] Filed: Sep. 14, 1988

Related U.S. Application Data

[63] Continuation-in-part of Ser. No. 939,540, Dec. 8, 1986, Pat. No. 4,792,133.

[30] Foreign Application Priority Data

Jan. 14, 1986 [GB] United Kingdom ............... 8529869

[51] Int. Cl.$^4$ ............... A63J 3/00; A63K 1/00; C09K 3/18
[52] U.S. Cl. ............... 272/3; 272/5; 252/88; 106/83; 106/84; 106/229; 428/403; 428/404; 428/407
[58] Field of Search ............... 272/3-5, 272/56.5 SS; 428/403, 404, 407, 443; 427/215, 220, 221, 138; 106/83, 84, 229, 901; 252/18

[56] References Cited

U.S. PATENT DOCUMENTS

| | | | |
|---|---|---|---|
| 1,600,515 | 9/1926 | Secoy | 252/88 |
| 3,533,953 | 10/1970 | Mills et al. | 252/88 |
| 4,452,926 | 6/1984 | Matsushima et al. | 428/407 |
| 4,598,019 | 7/1986 | Yokoyama | 428/407 |
| 4,792,133 | 12/1988 | Hawkins et al. | 272/3 |

FOREIGN PATENT DOCUMENTS 2359935 7/1976 France ............... 272/3

Primary Examiner—David A. Scherbel
Assistant Examiner—Richard E. Chilcot, Jr.
Attorney, Agent, or Firm—Spensley Horn Jubas & Lubitz

[57] ABSTRACT

The invention relates to a substitute soil material for laying as a sports surface for example a horse-race track. The material may be a sand or other fine granular material with a binder comprising a styrene-butadiene-styrene copolymer dispersed or dissolved in an oil which preferably is a soft grease at ordinary climatic temperatures. When laid, the surface may be maintained by periodic raking.

6 Claims, No Drawings

SUBSTITUTE GROUND SURFACE MATERIAL

The present application is a continuation-in-part of co-pending application Ser. No. 06/939540 filed Dec. 8, 1986 now U.S. Pat. No. 4,792,133.

The invention relates to ground surfaces and substitute soil material but not exclusively, it relates to treated particulate material adapted to be laid in defined areas so as to form recreational ground surfaces.

The invention described in U.S. Ser. No. 06/939540 provides substitute soil material comprising sand or the like particulate or granular mineral material treated with a binder comprising synthetic polymeric material dispersed or dissolved in an oil, or similar compound, said oil having a viscosity such that it is substantially non-fluid at ambient termperatures so as to produce an inert, discrete material permanently capable of being raked when laid in a layer upon a substrate. However it has now been found that careful selection of polymer is required in order that the binder shall remain substantially non-fluid and flexible when the ambient temperature range varies greatly, especially when very high temperatures are encountered such as in tropical and semi-tropical climates.

The invention further provides a horse race track having a surface formed of said substitute soil material.

It is an object of the present invention to provide a substitute ground surface material which retains the desired properties mentioned above even in extremes of climatic conditions.

In accordance with the present invention, there is provided a substitute ground surface material as defined above wherein the binder comprises a styrene-butadiene-styrene copolymer dispersed or dissolved in an oil or similar compound.

Advantageously, the particulate material may be of varying particle disc. The oil will conveniently have the consistency of a soft grease at normal temperatures and will become fluid at temperatures in a range immediately above climatic temperatures appropriate to the location of use. Suitable oils may be petroleum-based or may be selected from other oils including organic oils.

The styrene-butadiene-styrene (S.B.S.) may conveniently be added to the oil in particulate form to facilitate dissolution.

Selected oils will also be of a kind for which there is a reasonably wide margin of safety between the melting point of the polymeric material and the temperature at which heat degradation commences.

The S.B.S. copolymer is conveniently a conventional S.B.S. block-copolymer which typically comprises five butadiene moieties between two blocks of five styrene moieties. The styrene component gives the copolymer a high melting point so improving high temperature performances while the butadiene provides flexibility even at low temperatures where the styrene would normally be very brittle. Typically a melting point of around 80° C. is desirable as this is way above that normally encountered even in extreme climatic conditions.

The use of S.B.S. copolymers in place of the polymers described in 06/939540 will result in a material having the desired characteristics. The polymers described in 06/939540 all melt at around 45° C. and such temperatures can be encountered in extreme climatic conditions. The material of the present invention still functions acceptably at such temperatures.

It will be appreciated that the addition of the S.B.S. copolymer to the oil imparts an appreciable degree of resilience to the treated sand even in high ambient temperatures. This resilience is such that for example a horse's hoof landing on the surface of a horse race track formed of material according to the invention deforms the surface to a limited extend i.e. causes a limited shear movement. This allows the hoof to pivot in the track surface as the animal moves forward. However if the binder is fluid, the sand would move too freely to assist the next stage of the horse's movement, that is, the pushing back of the hoof against the track for the next stride. However, a track formed of substitute soil material according to the present invention not only possesses the desired limited shear action but also the firm reaction surface to assist the horse's next stride at all normal temperatures.

The track also has a limited capability for retaining air between the treated particles. This entrainment of air contributes to the comfortable under-foot conditions produced by the resilience of the binder in the construction of the track produced according to the invention. Additional resilience may be obtained by the addition of particles of cork or synthetic or natural rubber to the treated sand.

There will now be described an example of a material according to the invention. It will be understood that the description is given by way of example only and not by way of limitation.

EXAMPLE

In the example a batch of sand of varying particle size was treated. The range of particle sizes corresponds to the as-dug condition of the sand. However, the sand was dried before treatment.

A petroleum oil fraction having a consistency approximating to a soft grease at ambient temperatures (c. 1000 centipoise at 20°) e.g. Mobilsol 30 was heated to 160° C. Styrene-butadiene-styrene (S.B.S.) 5,5,5 block copolymer, e.g. Europrene Sol T161A/T161B/T161C (Enichem) and having a melt flow index of 25 was then added in particulate form to the heated oil in a ratio of 1 part S.B.S. to 9 parts oil by weight and caused to dissolve by a stirring operation. The dry sand was then added to the binder in the ratio of 100 parts sand to 6.5 parts binder and thoroughly mixed.

The resulting mixture was laid to a depth of 15-20 cm as a superstrate over subsoil or a suitable porous graded stone base and was found to give agreeable "going" characteristics for a horse. As an alternative the mixture may be laid on a membrane comprising a so-called geotextile, a non woven textile designed to reduce migration of particles between layers.

Maintenance of the track has been found to be easy, comprising simply raking or turning over the top 5 to 8 cm. Light rolling will be found to compact a thin upper layer of say 1-2 cm which acts to resist the entry of rainwater. If however, rain seeped into the track superstrate, and was unable to drain through the substrate it will be found to be readily propelled by firm rolling, whereupon the water will run off the surface if a suitable slight fall or camber is provided. Advantageously the substrate may be porous to minimise drainage problems. When the track is not in use it may be firmly rolled to become waterproof.

As other examples, the oil may be selected from bitumen or gas oil, siliconised oil, suitable latices, alginates or molasses. Laid surfaces or tracks according to the invention may be colored as desired by the addition of pigments during the mixing stage.

Superstrates formed according to the invention produce a marked degree of springiness to the laid area or track.

We claim:

1. Substitute ground surface material comprising sand or other particulate or granular mineral material treated with a binder comprising a styrene-butadiene-styrene copolymer dispersed or dissolved in an oil having a viscosity such that it is substantially non-fluid at ambient temperatures so as to produce an inert, discrete material permanently capable of being raked when laid in a layer upon a substrate.

2. Substitute ground surface material as claimed in claim 1 wherein said oil is selected from the group consisting of bitumen, gas oil and siliconised oil.

3. Substitute ground surface material as claimed in claim 1, wherein said styrene-butadiene-styrene copolymer is a block copolymer having a melting point of about 80° C.

4. Substitute ground surface material as claimed in claim 1, wherein coloring pigments are added to said ground surface material.

5. Substitute ground surface material comprising sand or other particulate or granular material treated with a binder comprising a styrene-butadiene-styrene copolymer dispersed or dissolved in a compound selected from the group consisting of latices, alginates, molasses and combinations thereof, said compound having a viscosity such that it is substantially non-fluid at ambient temperatures so as to produce an inert, discrete material permanently capable of being raked when laid upon a substrate.

6. A recreational or sports area having a surface formed of a substitute ground surface material comprising sand or other particulate or granular material treated with a binder comprising a styrene-butadiene-styrene copolymer dissolved or dispersed in an oil or similar compound, said oil having a viscosity such that it is substantially non-fluid at ambient temperatures so as to produce an inert, discrete material permanently capable of being raked when laid in a layer upon a substrate, wherein said material is laid upon a substrate.

* * * * *